United States Patent
Ho et al.

(10) Patent No.: US 11,290,157 B2
(45) Date of Patent: Mar. 29, 2022

(54) CONFIGURATION OF BEAM MANAGEMENT

(71) Applicant: Sony Corporation, Tokyo (JP)

(72) Inventors: Zuleita Ho, Lund (SE); Fredrik Rusek, Eslöv (SE); Olof Zander, Södra Sandby (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/090,692

(22) Filed: Nov. 5, 2020

(65) Prior Publication Data

US 2021/0058117 A1 Feb. 25, 2021

Related U.S. Application Data

(63) Continuation of application No. PCT/EP2019/061269, filed on May 2, 2019.

(30) Foreign Application Priority Data

May 9, 2018 (SE) .................................... 1830156-4

(51) Int. Cl.
H04B 7/06 (2006.01)
H04B 7/0417 (2017.01)
H04B 7/08 (2006.01)

(52) U.S. Cl.
CPC ......... *H04B 7/0417* (2013.01); *H04B 7/0695* (2013.01); *H04B 7/088* (2013.01)

(58) Field of Classification Search
CPC .... H04B 7/0417; H04B 7/0695; H04B 7/088; H04B 7/065
See application file for complete search history.

(56) References Cited

U.S. PATENT DOCUMENTS

| | | | |
|---|---|---|---|
| 2013/0223251 A1* | 8/2013 | Li | H04B 7/0619 370/252 |
| 2016/0150435 A1* | 5/2016 | Baek | H04W 24/10 370/252 |
| 2017/0367110 A1* | 12/2017 | Li | H04W 74/0816 |
| 2018/0048375 A1* | 2/2018 | Guo | H04B 7/024 |
| 2018/0049137 A1* | 2/2018 | Li | H04B 17/309 |
| 2018/0115361 A1* | 4/2018 | Li | H04W 72/046 |
| 2019/0007123 A1* | 1/2019 | Rune | H04B 7/0695 |
| 2019/0104549 A1* | 4/2019 | Deng | H04W 72/0446 |
| 2019/0215045 A1* | 7/2019 | Choi | H04B 7/088 |

OTHER PUBLICATIONS

International Search Report and Written Opinion from corresponding International Application No. PCT/EP2019/061269, dated Jul. 15, 2019, 10 pages.

* cited by examiner

*Primary Examiner* — Kenneth T Lam
(74) *Attorney, Agent, or Firm* — Tucker Ellis LLP

(57) ABSTRACT

A method of operating a terminal having multiple antenna arrays includes, using the multiple antenna arrays: respectively monitoring and reporting on at least one downlink beam-sweeped transmission of pilot signals. The method also includes, based on a comparison of values indicative of a path loss of the pilot signals monitored using the multiple antenna arrays: selectively triggering adjustment of one or more values of at least one control parameter of said monitoring and reporting.

14 Claims, 11 Drawing Sheets

CONFIGURATION OF BEAM MANAGEMENT

RELATED APPLICATION DATA

This application is a continuation of International Patent Application No. PCT/EP2019/061269, filed May 2, 2019, which claims the benefit of Swedish Patent Application No. 1830156-4, filed May 9, 2018, the disclosures of which are incorporated herein by reference in their entireties.

TECHNICAL FIELD

Various techniques relate to monitoring and reporting on beam-sweeped transmissions of pilot signals. Various techniques specifically relate to adjusting one or more values of at least one control parameter of said monitoring and reporting.

BACKGROUND

Beamforming becomes increasingly popular for wireless communication. One advantage of beamforming is the ability to transmit on high carrier frequencies by increasing an antenna aperture, e.g., above 6 GHz and even up to 60 GHz or beyond. In high frequency bands, signal powers degrade much more severely over distance comparing to low frequency. Beamforming brings the advantage of compensating the power loss by the beamforming gain and therefore making transmission of high frequency signals over a distance feasible. Another advantage of beamforming is the availability of spatial multiplexing, thereby increasing spectral efficiency. The overall antenna efficiency can be increased.

Various applications of beamforming are envisioned in the Third Generation Partnership Project (3GPP) New Radio (NR) or 5G communication system. Within the scope of 3GPP NR, the devices—such as terminals/user equipments (UEs) and base stations (BS)—shall be able to communicate with significantly higher radio frequencies than the existing 3GPP standards such as Wideband Code Division Multiple Access (WDCMA) and Long Term Evolution (LTE). Examples of such higher frequencies are within 20-40 GHz, in addition to the communication bandwidths around 1-2 GHz that are specified for the LTE and WDCMA. The higher frequencies are sometimes referred to as "mmWave" frequencies, since the wavelength is approaching same order of magnitudes as a millimeter.

When communicating at these high frequencies and thereby small wavelengths, the dimensions of each antenna element become small. Thus, there is the opportunity to include many more antenna elements for mmWave communication for a given physical size of an antenna array—sometimes also referred to as antenna module or antenna panel—, than it would for a e.g. 1 GHz modem. Also, since the radio propagation loss is scaled with frequency, a high antenna gain is required to provide reasonable system coverage when communicating using mmWave frequencies.

A phase-coherent superposition of transmitting and/or receiving (communicating) on a plurality of antenna elements of an antenna array is referred to as beamforming. The amplitude and phase relationship between the different antenna elements are specified by the specific values of antenna weights, where each value of the antenna weights is indicative of the amplitude and phase of a respective antenna element. Different values of the antenna weights are associated with different beams; beams may differ in terms of direction, beam width, etc. Beamforming may generally be employed for receiving signals (receive beamforming) and/or for transmitting signals (transmit beamforming). The use of multiple antenna elements is sometimes referred to as Multiple Input Multiple Output (MIMO).

When using beamforming, the direction of the beam may have a significant impact on the link performance. This is because of the transmission characteristics varying for different spatial propagation paths that are defined by the beams. For example, a particular low path loss may be expected for transmission along a line-of-sight spatial propagation channel. Generally, a beam directed in the right direction will improve the link budget with many dBs. The path loss associated with a given beam correlates with the beam strength of that beam.

According to reference implementations, beam management is employed in order to determine the values of the antenna weights, i.e., in order to identify the appropriate beam. Typically, beam management includes a beam-sweeped transmission of pilot signals. In a beam sweep, one or more pilot signals are transmitted on multiple beams; based on a receive property of the pilot signal, it is then possible to identify the appropriate beam having a low path loss, by monitoring a receive property of the pilot signals and reporting thereon.

It has been observed that beam management requires significant resources. Often, beam management requires repeated beam sweeps to search for redundant beams.

SUMMARY

A need exists for advanced techniques of beam management. Specifically, a need exists for advanced techniques of beam management which mitigate at least some of the above-identified restrictions or drawbacks.

This need is met by the features of the independent claims. The features of the dependent claims define embodiments.

A method of operating a terminal which includes multiple antenna arrays is provided. The method includes, using the multiple antenna arrays: respectively monitoring and reporting on at least one downlink beam-sweeped transmission of pilot signals. The method also includes, based on a comparison of values indicative of a path loss of the pilot signals monitored using the multiple antenna arrays: selectively triggering adjustment of one or more values of at least one control parameter of said monitoring and reporting.

A computer program product or computer program includes program code. The program code can be executed by at least one processor. The program code can be executed by at least one processor. Executing the program code causes the at least one processor to perform a method of operating a terminal which includes multiple antenna arrays is provided. The method includes, using the multiple antenna arrays: respectively monitoring and reporting on at least one downlink beam-sweeped transmission of pilot signals. The method also includes, based on a comparison of values indicative of a path loss of the pilot signals monitored using the multiple antenna arrays: selectively triggering adjustment of one or more values of at least one control parameter of said monitoring and reporting.

A terminal includes multiple antenna arrays. The terminal also includes a control circuitry configured to use the multiple antenna arrays: respectively monitor and report on at least one downlink beam-sweeped transmission of pilot signals. The control circuitry is also configured to selectively trigger adjustment of one or more values of at least one control parameter of said monitoring and reporting, based on a comparison of values indicative of a path loss of the pilot signals monitored using the multiple antenna arrays.

A method of operating a base station includes implementing at least one downlink beam-sweeped transmission of pilot signals. The method also includes receiving, from a terminal, an uplink request signal indicative of one or more requested values of at least one control parameter used by the terminal to monitor and report on the downlink beam-sweeped transmission. The method also includes transmitting, to the terminal, a downlink configuration control signal associated with the uplink request message and indicative of one or more values one or more values of the at least one control parameter.

A computer program product or computer program includes program code. The program code can be executed by at least one processor. The program code can be executed by at least one processor. Executing the program code causes the at least one processor to perform a method of operating a base station. The method includes implementing at least one downlink beam-sweeped transmission of pilot signals. The method also includes receiving, from a terminal, an uplink request signal indicative of one or more requested values of at least one control parameter used by the terminal to monitor and report on the downlink beam-sweeped transmission. The method also includes transmitting, to the terminal, a downlink configuration control signal associated with the uplink request message and indicative of one or more values one or more values of the at least one control parameter.

A base station includes a control circuitry configured to implement at least one downlink beam-sweeped transmission of pilot signals. The control circuitry is also configured to receive, from a terminal, an uplink request signal indicative of one or more requested values of at least one control parameter used by the terminal to monitor and report on the downlink beam-sweeped transmission. The control circuitry is also configured to transmit, to the terminal, a downlink configuration control signal associated with the uplink request message and indicative of one or more values one or more values of the at least one control parameter.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
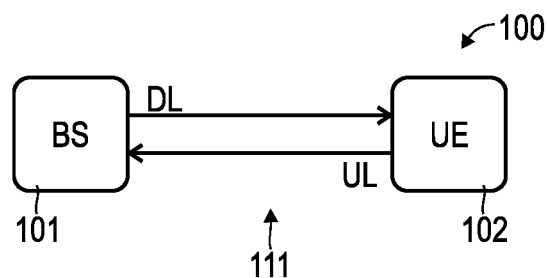
FIG. 1 schematically illustrates a communication system including a base station and the UE according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of wireless communication are disclosed. For this, a wireless communication system may be employed, the wireless communication system including at least two nodes configured to transmit and/or received. In some examples, a wireless communication network can be used. For example, the network may be a cellular network including multiple cells, wherein each cell is defined by one or more BSs. Example network architectures include the 3GPP LTE or NR architecture. Furthermore, respective techniques may be readily applied to various kinds of non-3GPP-specified architectures, such as Bluetooth, satellite communication, IEEE 802.11x Wi-Fi technology, etc.

Specifically, various techniques described herein relate to wireless communication using phase-coherent transmitting and/or phase-coherent receiving, i.e., using beamforming to transmit and/or receive on beams having low path loss. A MIMO communication system can be employed. To select the appropriate beams having low path loss, beam management can be employed. Reference implementations of beam management are, e.g., described in 3GPP TSG RAN WG1 meeting #86, R1-166089; R1-167466; R1-167543;

R1-166389. Details of reporting are described in 3GPP Technical Specification (TS) TS 38.215, Version 15.0.0.

As a general rule, beam management can include various steps such as (i) a beam-sweeped transmission of pilot signals at a transmitter, e.g., the BS; and/or (ii) monitoring the beam-sweeped transmission at a receiver, e.g., the UE; and/or (iii) reporting on the beam-sweeped transmission of pilot signal, e.g., the UE reporting to the BS.

The beam management can help to determine values for antenna weights—e.g., phase shift and/or amplitude gain—of antennas of an antenna array. By using certain values of antenna weights, a well-defined spatial profile of the wireless transmission via the plurality of antenna elements may be obtained, typically referred to as a beam. The beam may thus define a directivity of transmitting and/or receiving. The spatial profile may define a certain width and amplitude of the beam. The spatial profile may define side lobes which may be suppressed if compared to a central peak of the beam. The spatial profile may be associated with a propagation channel of the respective signals; here, the propagation channel may include one or more reflections, etc. Each beam may be associated with a certain path loss. Generally, lower path losses can result in a higher quality of communication on the beam.

Specifically, according to various examples, it is possible to select an appropriate pair of beams, i.e., an appropriate pair including a transmit beam and a receive beam. The receive beam may be tailored to the propagation channel defined by the transmit beam. In further examples, the transmit beam may be tailored to the propagation channel defined by the receive beam.

The techniques described herein may facilitate determining beams used for transmission of data—e.g., payload data such as application data or control data such as Layer 2 or Layer 3 control data. As such, the techniques described herein may generally facilitate efficient beamforming and/or spatial diversity. Facilitating beamforming may, in turn, facilitate spatial multiplexing and high frequencies, e.g., above 6 GHz or 10 GHz or even above 50 GHz. The bandwidth can be in the range of 100 MHz and 1 GHz.

Specifically, according to various examples described herein, the values of the antenna weights for a desired beam can be efficiently and accurately determined. For example, control overhead required for the associated beam management can be reduced if compared to reference scenarios. The latency of determining the antenna weights can be reduced. At the same time, the appropriate beam may be identified at high accuracy.

Hereinafter, various techniques may employ a codebook (CB) for beam management. The CB may determine associated values for the antenna weights from a plurality of predefined candidate values of the antenna weights. For example, these candidate values may be included in a CB. Each entry in the CB may be associated with a beam. To select an appropriate beam from the CB, a beam-sweeped transmission of pilot signals may be employed.

As a general rule, different kinds and types of pilot signals may be employed in the various examples described herein. For example, a Channel State Information Reference Signal (CSI-RS) may be employed as a pilot signal. Alternatively or additionally, synchronization signals transmitted on a physical broadcast channel (SS/PBCH) may be used as pilot signals. To avoid ambiguities between pilot signals transmitted on different beams, each pilot signal may be indicative of the particular beam on which it is transmitted.

The beam-sweeped transmission of pilot signals may include one or more beam sweeps. For example, a downlink (DL) transmit beam sweep may be employed at the BS and a downlink (DL) receive beam sweep may be employed at the UE. The transmit and receive beam sweeps can be time-aligned.

Here, a transmit beam sweep of a beam-sweeped transmission of pilot signals may include transmitting of pilot signals on multiple beams of the beam sweep. For example, all or at least some candidate values of antenna weights included in the CB may be covered by the transmit beam sweep. The BS may then transmit one or more pilot signals on the beams of the beam sweep; hence, the BS implements the transmit beam sweep. The UE can attempt to receive the pilot signals. For this, the UE may also employ a beam sweep, i.e., a receive beam sweep of the beam-sweeped transmission of pilot signals. The UE attempting to receive on the various beams of the receive beam sweep is sometimes referred to as monitoring the DL beam-sweeped transmission. When monitoring the DL beam-sweeped transmission, the UE can perform measurements of one or more values indicative of a path loss of the pilot signals received on the various receive beams and having propagated along the associated propagation channels.

By comparing one or more values indicative of the path loss of the pilot signals communicated on the various beams of the beam sweep, it becomes possible to conclude back on which beam is appropriate. To inform the BS about the beam strength of the various beams, an UL feedback control signal may be transmitted by the UE and received by the BS (reporting of the DL beam-sweeped transmission). As a general rule, the UL feedback control signal may be indicative of the one or more values indicative of the path loss directly and/or a combination of one or more such values. For example, the UL feedback control signal may be explicitly indicative of the value indicative of the path loss, e.g., by including respective information elements which indicate the magnitude of the value. Alternatively, it would be possible that the UL feedback control signal is implicitly indicative of the value indicative of the path loss, e.g., by indicating a ranking of the beams with respect to the value: e.g., a sequence of respective beam indices may be included in the UL feedback control signal which indicates the beams having small path loss to large path loss in descending order.

As a general rule, various values indicative of the path loss may be relied upon in the various examples described herein. Examples include: Reference Signal Received Power (RSRP), Reference Signal Received Quality (RSRQ) or Signal-to-Interference-and-Noise (SINR). Hereinafter, for sake of simplicity, reference will be made to RSRP as a particular implementation of a value indicative of the path loss; but, generally, other values indicative of the path loss may be readily employed.

Various techniques described herein facilitate beam management in a scenario where the UE includes multiple antenna arrays. Each antenna array may include a plurality of antennas in a well-defined spatial arrangement for a phased receiving and/or phased transmitting, i.e., for receive beamforming and/or transmit beamforming. As a general rule, the multiple antenna arrays of the UE may be offset from each other, i.e., arranged at different positions in the UE housing and/or arranged under different orientations within the UE housing. For example, a first antenna array may be arranged to face the front side of the UE, the front side also including a display, etc.; a second antenna array may be arranged to face the back side of the UE, the back side being opposite to the front side. There may be more than two antenna arrays.

Various techniques are based on the finding that—depending on the particular orientation of the UE—the beam strength can vary significantly between beams formed by different antenna arrays. For example, it has been observed that—under a given orientation of the UE—the beams of a first array can generally have a beam strength that is 20 dB above a beam strength of the beams of a second array.

According to examples, monitoring and reporting on at least one DL beam-sweeped transmission of pilot signals can be implemented for each one of the plurality of antenna arrays. Then, based on a comparison of values indicative of the path loss of the pilot signals using the multiple antenna arrays, adjustment of one or more values of at least one control parameter of the monitoring and reporting can be triggered.

In other words, it is possible that the beam management is implemented differently for different antenna arrays.

Based on this finding of a strong correlation between beam strength and antenna arrays used for forming the beams, according to various examples, the UE can provide UL report signaling indicative of such a observed difference in the beam strengths of the beams associated with the different antenna arrays, to thereby trigger the adjustment.

As a general rule, various options are available for adjusting the monitoring and/or reporting on the DL beam-sweeped transmission. For example, beam monitoring can be implemented more frequently for an antenna array used for forming beams having a comparably large beam strength; while beam monitoring can be implemented less frequently for antenna array used for forming beams having a comparably small beam strength. Alternatively or additionally, beam reporting can be implemented using a larger information depth for an antenna array used for forming beams having a comparably large beam strength; while reporting can be implemented using a smaller information depth for an antenna array used for forming beams having a comparably small beam strength.

To trigger the adjustment of the at least one control parameter, the UE may transmit an UL request signal. For example, the UL request signal may be indicative of a result of the comparison of the values indicative of the path loss of the pilot signals monitored using the multiple antenna arrays; then, the BS may draw an appropriate conclusion on how to adjust the at least one control parameter. In other examples, respective logic of how to appropriately adjust the at least one control parameter depending on the comparison may also reside at least partly at the UE. Thus, it is generally possible that the UL request signal is indicative of one or more requested values of the at least one control parameter.

As a general rule, various control parameters can be adjusted. On example of a control parameter that may be adjusted includes a reporting threshold: Reporting may be associated with thresholds. For example, a lower reporting threshold for the value indicative of the path loss that needs to be exceeded for the respective feedback information of an associated beam to be included in the UL feedback control signal may be a control parameter that is adjusted. For example, multiple lower thresholds may be used, e.g., one threshold per antenna array and/or one threshold per BS performing beam-sweeped transmission of pilot signals. The UE can request a certain count of lower thresholds and/or values for the lower thresholds, using the UL request signal.

A further example of a control parameter that can be adjusted includes a measurement time gap between subsequent measurements of said monitoring. The measurement time gaps are associated with the timing of the measurements of the monitoring.

FIG. 1 schematically illustrates a wireless communication system 100 that may benefit from the techniques disclosed herein. The wireless communication system 100 may implement a network. The network may be a 3GPP-standardized network such as 4G or 5G NR. The wireless communication network 100, in the example of FIG. 1, is a cellular network including multiple cells. Each cell is associated with a respective BS (cells are not illustrated in FIG. 1).

The network 100 includes a BS 101 and a UE 102. A wireless link 111 is established between the BS 101—e.g., a gNB in the 3GPP NR framework—and the UE 102. The wireless link 111 includes a DL wireless link from the BS 101 to the UE 102; and further includes an UL wireless link from the UE 102 to the BS 101. Time-division duplexing (TDD), frequency-division duplexing (FDD), and/or code-division duplexing (CDD) may be employed for mitigating interference between UL and DL. Likewise, TDD, FDD, CDD and/or spatial division duplexing (SDD) using beamforming may be employed for mitigating interference between multiple UEs communicating on the wireless link 111 (not shown in FIG. 1).

The wireless link 111 may occupy frequencies above 6 GHz. mmWave technology may be employed.

The UE 102 may be one of the following: a smartphone; a cellular phone; a tablet; a notebook; a computer; a smart TV; an MTC device; an eMTC device; an IoT device; an NB-IoT device; a sensor; an actuator; etc.

Figure 2:
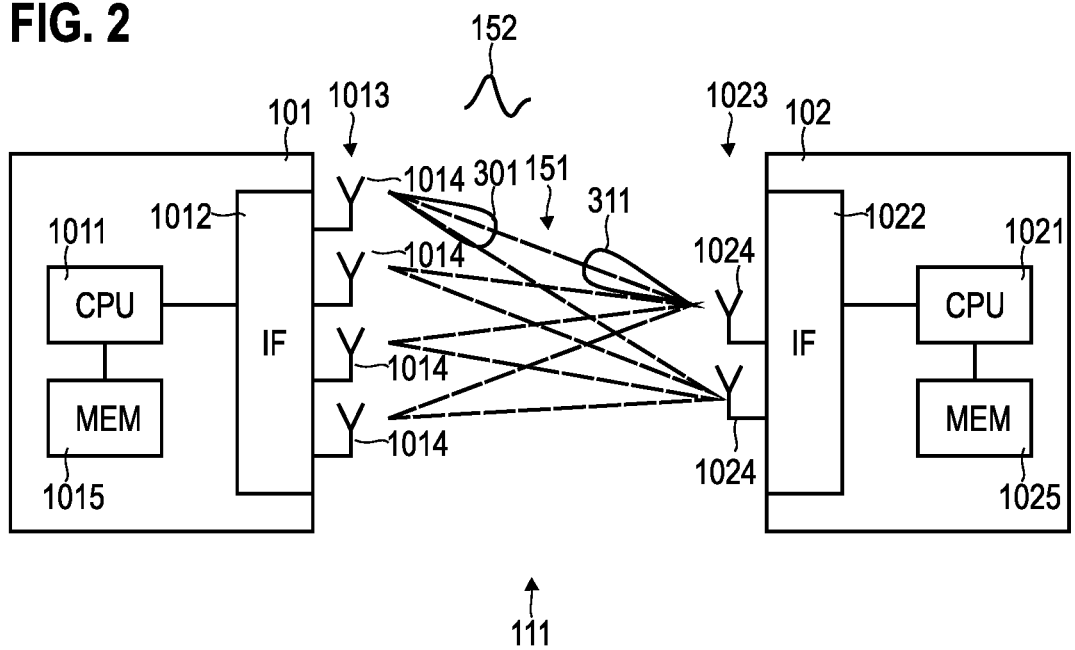
FIG. 2 schematically illustrates a MIMO communication system including a base station and a UE according to various examples.

FIG. 2 schematically illustrates the BS 101 and the UE 102 in greater detail. The BS 101 and the UE 102 implement a MIMO system.

The BS 101 includes a control circuitry 1011 and a wireless interface 1012, sometimes also referred to as frontend. The interface 1012 is coupled via antenna ports (not shown in FIG. 2) with an antenna array 1013 including a plurality of antennas 1014. In some examples, the antenna array 1013 may include at least 30 antennas 1014, optionally at least 110 antennas, further optionally at least 200 antennas. Sometimes, a scenario implementing a large number of antennas 1014 is referred to as full dimension MIMO (FD-MIMO) or massive MIMO (Massive MIMO, MaMi). Each antenna 1014 may include one or more electrical traces to carry a radio frequency current. Each antenna 1014 may include one or more LC-oscillators implemented by the electrical traces. Each trace may radiate electromagnetic waves with a certain beam pattern. In some examples the BS 101 may include multiple antenna arrays.

The BS 101 further includes a memory 1015, e.g., a non-volatile memory. The memory may store program code that can be executed by the control circuitry 1011. Executing the program code may cause the control circuitry 1011 to perform techniques with respect to implementing beam management, a DL beam-sweeped transmission of pilot signal, receiving UL feedback control signals of reporting on the DL beam-sweeped transmission, implementing transmit beam sweeps of the pilot signals, beam management, adjusting at least one control parameter of monitoring and reporting on the DL beam-sweeped transmission, etc.

The UE 102 includes a control circuitry 1021 and an interface 1022, sometimes also referred to as frontend. The interface 1022 is coupled via antenna ports (not shown in FIG. 2) with an antenna array 1023 including a plurality of antennas 1024. In some examples, the antenna array 1023 may include at least 6 antennas, optionally at least 16 antennas, further optionally at least 32 antennas. Generally, the antenna array 1023 of the UE 102 may include fewer antennas 1024 than the antenna array 1013 of the BS 101. Each antenna 1024 may include one or more electrical traces to carry a radio frequency current. Each antenna 1024 may include one or more LC-oscillators implemented by the electrical traces. Each trace may radiate electromagnetic waves with a certain beam pattern.

Figure 3:
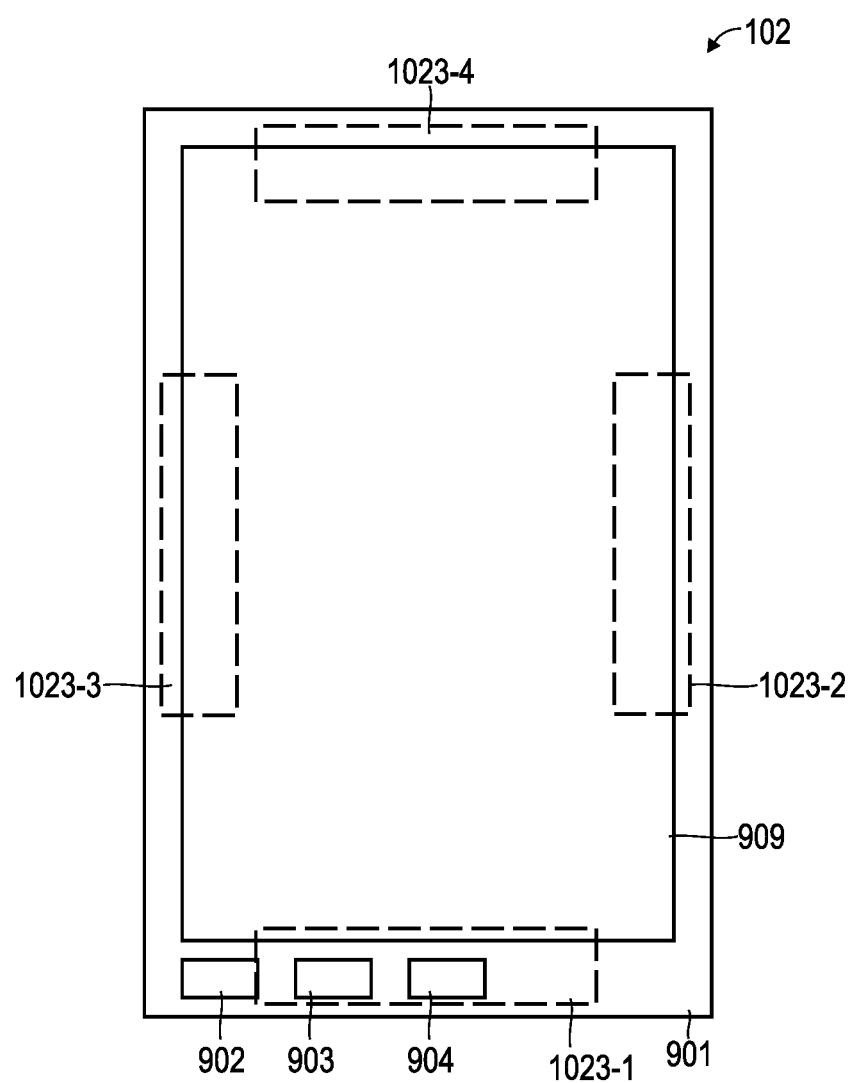
FIG. 3 schematically illustrates a UE including multiple antenna arrays, each antenna array including a plurality of antennas for phase-coherent transmitting and/or receiving according to various examples.

Also the UE 102 may include multiple antenna arrays; this is illustrated in FIG. 3 where multiple antenna arrays 1023-1-1023-4 offset from each other are illustrated. Here, a frontside of the UE 102 is illustrated which includes a housing 901, a display 909, and buttons 902-904.

Again referring to FIG. 2, the UE 102 further includes a memory 1025, e.g., a non-volatile memory. The memory 1025 may store program code that can be executed by the control circuitry 1021. Executing the program code may cause the control circuitry 1021 to perform techniques with respect to beam management, monitoring and reporting on a DL beam-sweeped transmission of pilot signals, transmitting UL feedback control signals of the reporting on the DL beam-sweeped transmission, implementing receive beam sweeps of the pilot signals, triggering adjustment of at least one control parameter of monitoring and reporting on the DL beam-sweeped transmission.

FIG. 2 also illustrates aspects with respect to propagation channels 151. FIG. 2 schematically illustrates that different propagation channels 151 (dashed lines in FIG. 2) are implemented on the wireless link 111. The different propagation channels 151 are associated with different pairs of beams 301, 311 (in FIG. 2, for sake of simplicity, only a single beam 301 implemented by BS 101 and a single beam 311 implemented by the UE 102 are illustrated). For example, to implement a certain propagation channel 151 for DL communication, a certain DL transmit beam may be selected for the antenna array 1013 of the BS 101. Here, the beam may generally be implemented by certain values of the antenna weights of the antennas 1014, 1024/antenna ports of the respective antenna array 1013, 1023. Sometimes, the antenna weights are also referred to as steering vectors or precoding parameters. Accordingly, different beams 301 may be addressed by using different amplitude and phase configurations for the various antennas 1014, 1024/antenna ports of the respective antenna patches 1013, 1023, i.e., different values for the antenna weights. While in FIG. 2 line-of-sight propagation channels 151 are illustrated, in other examples, non-line-of-sight propagation channels 151 are possible.

Different ones of the propagation channels 151 and, as such, different beams may have different transmission characteristics such as path loss. In particular, different propagation channels 151 can have different fading profiles at the position of the respective receiver. Fading typically occurs due to destructive interference of reflected electromagnetic waves carrying the signals at the position of the receiver. Thus, the link performance will vary significantly depending on the selected beams 301, 311/propagation channel 151.

By using beam management, selection of the appropriate pair of transmit beam 301 and receive beam 311 can be achieved. This helps to provide diversity to reduce fading. Details with respect to how to beam management are illustrated in connection with FIG. 4.

Figure 4:
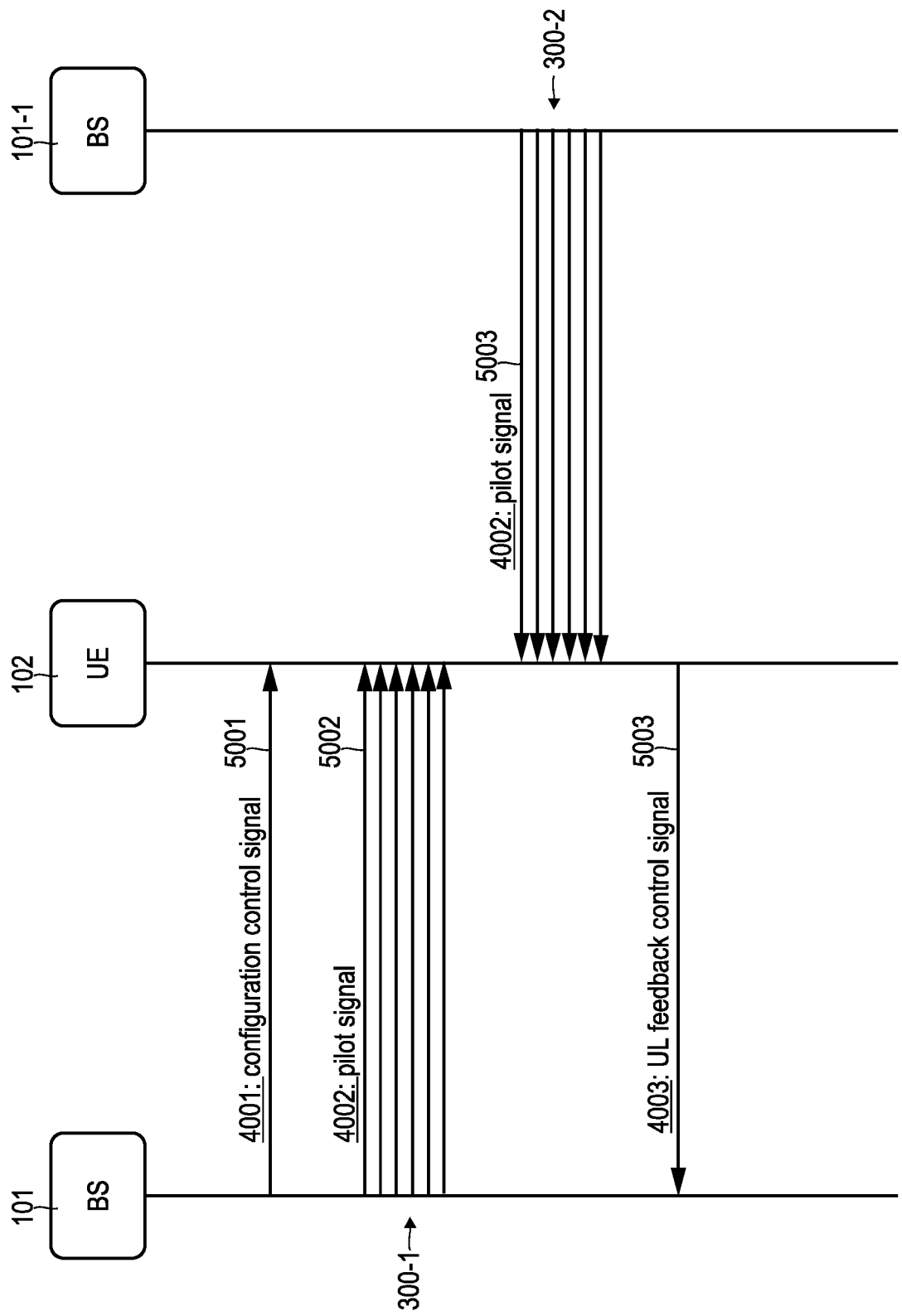
FIG. 4 is a signaling diagram of beam management according to various examples.

FIG. 4 illustrates aspects with respect to beam management. FIG. 4 is a signaling diagram of communication between the BS 101 and the UE 102.

The BS 101 is the serving BS of the UE 102; i.e., a data connection, sometimes also referred to as bearer, set up using Layer 3 control signaling—e.g., Radio Resource Control (RRC) control signaling—, may be established between the UE 102 and the BS 101 on the wireless link 111. This is sometimes referred to as the UE 102 operating in connected mode. The UE may also be operating in idle mode where no such data connection is established; then the UE 102 may be said to camp on the cell associated with the BS 101.

FIG. 4 also illustrates communication between a further BS 101-1 and the UE 102. The further BS 101-1 can be associated with a neighboring cell adjacent to the cell associated with the BS 101. There may be no data connection established between the UE 102 and the BS 101-1. Initially, at 5001, a DL configuration control signal 4001 is transmitted by the BS 101 and received by the UE 102. In 3GPP NR, the DL configuration control signal may be implemented by a RRC reconfiguration message. The DL configuration control signal may be indicative of one or more values of at least one control parameter according to which the UE 102 implements monitoring and reporting of beam-sweeped transmissions 300-1, 300-2 of DL pilot signals 4002 at 5002 and 5003, respectively. In more general terms, the DL configuration control signal 4001 can synchronize configuration of the beam management between the BS 101 and the UE 102.

The beam-sweeped transmission 300-1 may include a transmit beam sweep at the BS 101. The UE 102 can monitor the beam-sweeped transmission 300-1, e.g., using one or more receive beam sweeps. Monitoring may include the UE 102 taking measurements on one or more receive properties—e.g., amplitude and/or phase—of the pilot signals 4002. Then, the UE 102 can conclude back on the path loss experienced by the pilot signals 4002.

Similar considerations as set forth above with respect to the beam-sweeped transmission 300-1 may also apply to the beam-sweeped transmission 300-2.

At 5003, the UE 102 transmits an UL feedback control signal 4003 to the BS 101, which corresponds to reporting on the DL beam-sweeped transmission 300-1.

Next, details with respect to the DL configuration control signal 4001 are explained. For example, values of one or more of the following control parameters may be indicated by the DL configuration control signal 4001: (i) Measurement objects, including whitelisted cells, i.e., cells for which measurements associated with monitoring a beam-formed transmission of pilot signals is to be included, and further including blacklisted cells, i.e., cells for which respective beamformed transmissions are not to be monitored. (ii) Reporting configuration: Reporting criterion which triggers the UE to transmit a UL feedback control signal, sometimes also referred to as measurement report; (iii) Pilot signal type, e.g., SS/PBCH or CSI-RS; (iv) Reporting format of the UL feedback control signal 4003, e.g., including a reporting threshold absTreshCSI-RS-Consolidation, and/or RSRP per cell/per beam, and/or max. number of cells to be included in the feedback control signal, and/or maximum number of reported beams per cell maxNroRsIndexesToReport; (v) Measurement identities: pairing of measurement objects to reporting configurations (1-to-many, many-to-1); (vi) Quantity configurations: Definitions of measurement quantities, i.e., values indicative of path loss used for measurement such as RSRP, SINR, etc . . . , and filtering methods; (vii) Measurement time gaps.

For periodic or semi-periodic reporting, the UE 102 can be configured to transmit the UL feedback control signal 4003 every {5, 10, 20, 40, 80, 160, 320} slots (see section 5.2.1.4 in 3GPP TS 38.214, Version 15.1.0); whereas, for aperiodic reporting, transmitting of the UL feedback control signal 4003 can be triggered by higher layer configured parameter.

Figure 5:
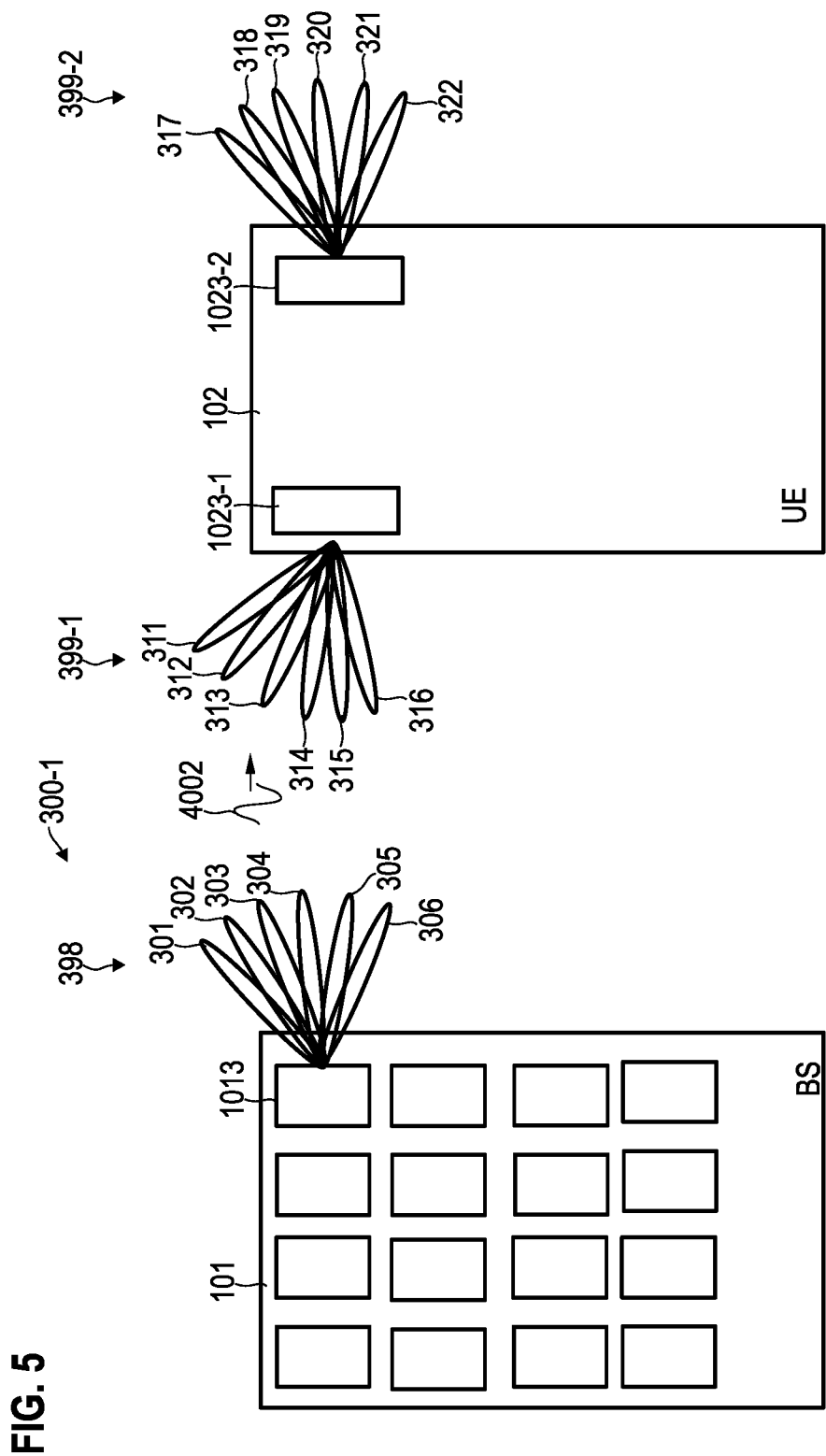
FIG. 5 schematically illustrates beam-sweeped transmissions of pilot signals according to various examples.

FIG. 5 illustrates aspects with respect to the beam-sweeped transmission 300-1 of DL pilot signals 4002. The pilot signals 4002 are transmitted by the BS 101 and received by the UE 102. As illustrated, in the scenario FIG. 5, the UE 102 includes two antenna arrays 1023-1, 1023-2. The beam-swept transmission 300-1 includes a transmit beam sweep 398 implemented at the BS 101. The transmit beam sweep 398 includes transmitting DL pilot signals 4002 on multiple transmit beams 301-306.

FIG. 5 illustrates aspects with respect to monitoring the beam-sweeped transmission 300-1 at the UE 102. Here, it is possible that the UE 102 is configured to control the antenna arrays 1023-1, 1023-2 to implement monitoring the beam-sweeped transmission 300-1 such that for each transmit beam 301-306 all received beams 311-322 are swept. In detail, to monitor the beam-sweeped transmission 300-1, the UE 102 implements two receive beam sweeps 399-1, 399-1 implemented at the UE 102. The receive beam sweep 399-1 is implemented by the antenna array 1023-1 and includes the receive beams 311-316; while the receive beam sweep 399-2 is implemented by the antenna array 1023-2 and includes the receive beams 317-322.

To time-align the transmit beam sweep 398 and the receive beam sweeps 399-1, 399-2, the following technique is may be applied: while the transmit beam 304 is active— i.e., the BS 101 controls the antenna array 1013 to transmit DL pilot signals 4002 on the transmit beam 304—, the UE 102 may control the antenna arrays 1023-1, 1023-2 to first activate the receive beam 311, then to activate the receive beam 312, and so on. This corresponds to TDD beam sweeping. Instead of pure TDD, also FDD can be employed.

Generally, when monitoring, the UE 102 can be configured to measure the RSRP of pilot signals for each pair of transmit beams 301-306 and receive beams 311-322.

As a general rule, each receive beam 311-322 may have a unique index, know to the BS 101. Likewise, each transmit beam 301-306 may have a unique index.

Thus, the total number of measurements X executed by the UE is:

$$X = ma_1 * M_b * N_a * N_b, \quad (1)$$

wherein $ma_1$ is the number of antenna arrays used by the BS 101 to serve the UE 102 ($ma_1=1$ in FIG. 5), $N_a=2$ is the number of antenna arrays 1023-1, 1023-2 of the UE 102, $N_b$ is the number of receive beams per antenna array 1023-1, 1023-2 of the UE 102, and $M_b$ is the number of transmit beams per antenna array 1013 of the BS 101.

Once the measurements associated with said monitoring the beam-sweeped transmission have been completed, the UE 102 is configured to implemented reporting on the beam-sweeped transmission 300-1. Details with respect to said reporting are illustrated in FIG. 6.

Figure 6:
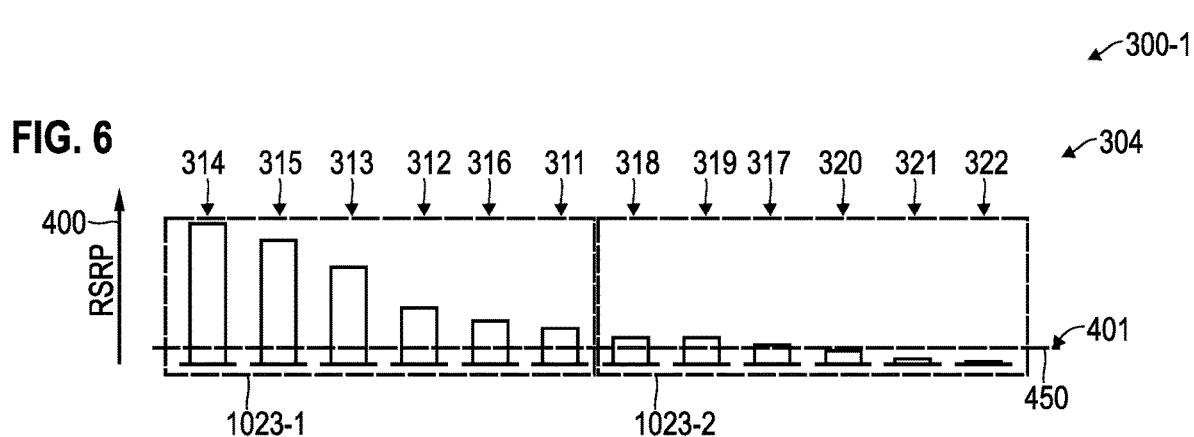
FIG. 6 schematically illustrates reporting on a beam-sweeped transmission of pilot signals according to various examples.

FIG. 6 illustrates aspects with respect to the beam-sweeped transmission 300-1 of DL pilot signals 4002. Specifically, FIG. 6 illustrates aspects with respect to reporting on the beam-sweeped transmission 300-1.

FIG. 6 illustrates the RSRP 400 which is indicative of the path loss measured for each one of the receive beams 311-322 at the UE 102, while the BS 101 transmits the DL pilot signals 4002 using the transmit beam 304 (as such, respective RSRP values 400 can be provided for each transmit beam 301-306 of the beam-sweeped transmission 300-1, while FIG. 6 only illustrates the RSRP 400 for the transmit beam 304 for sake of simplicity).

As will be appreciated from FIG. 6, the RSRP 400 varies for the different receive beams 311-322. For example, the receive beam 314 is associated with the highest RSRP and the receive beam 322 is associated with the lowest RSRP.

As a general rule, various options are available to implement reporting on the measured RSRPs 400. In the example of FIG. 6, the UE 102 reports up to maxNroRsIndexesTo-Report beam indices in order of decreasing quantity of the RSRP 400. The UE 102 can the report the index of the best beam (having largest RSRP) and the beam indices of at least some further beams whose RSRPs are above absTreshCSI-RS-Consolidation, i.e., above the value 450 of the lower reporting threshold 401. The RSRPs 400 are reported to the BS 101 by including a respective indicator in the UL feedback control signal 4003 if the RSRP 400 exceeds the value 450 of the lower reporting threshold 401: in the scenario FIG. 6, this is the case for the receive beams 311-319; such that the RSR P 400 is not reported for the receive beams 320-322.

As a general rule, in a simple scenario, the respective beam index may be indicated. In other examples, the measured RSRP 400 may be indicated, together with the respective beam index.

In the example of FIG. 6, there is a pronounced correlation between the RSRP 400 and the antenna arrays 1023-1, 1023-2 used for forming the respective receive beams 311-322: the received beams 311-316 formed by the antenna array 1023-1 have a systematically higher RSRP 400 then the receive beams 317-322 of the antenna array 1023-2. This is because the UE 102 is oriented such that the antenna array 1023-1 faces the BS 101; while the antenna array 1023-2 is oriented away from the BS 101. Nonetheless, in the example of FIG. 6, the same value 450 of the lower reporting threshold 401 is used for the receive beams 311-316 formed by the antenna array 1023-1 and for the receive beams 317-322 formed by the antenna array 1023-2.

Figure 7:
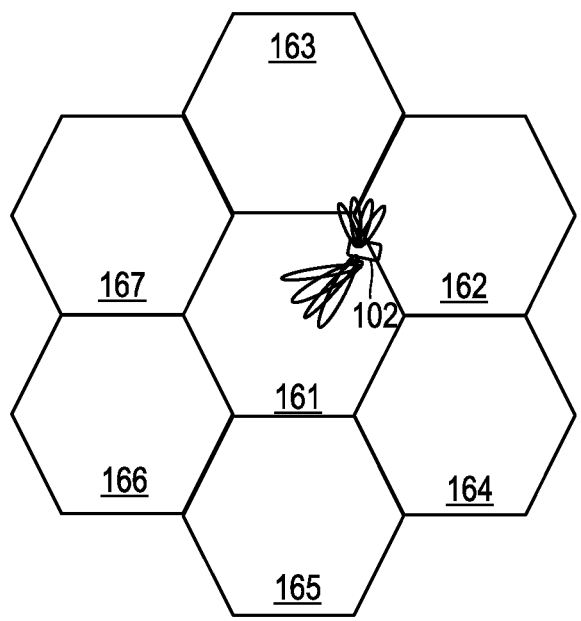
FIG. 7 schematically illustrates beam management in a multi-cell scenario of a cellular network according to various examples.

FIG. 7 illustrates aspects with respect to beam-formed transmission of pilot signals by multiple BSs 101, 101-1 associated with multiple cells 161-167. For example, the cell 161 can be associated with the BS 101 and the cell 162 can be associated with the BS 101-1.

Based on eq. (1) it follows that for multiple cells 161-167 the total number of measurements X executed by the UE is:

$$X = \Sigma_{i \in WL} ma_i * M_b * N_a * N_b, \quad (2)$$

where i denotes the particular cell 161-167 in the cell whitelist WL indicated by the DL configuration control signal 4001.

As will be appreciated from eq. (1) and eq. (2) the total number of measurements—and along with this—the total number of reported RSRPs 400 can be large. This results in increased control signaling overhead of the beam management.

For example, for cell i=3 the following beam measurements are taken:

$$b_{i0} \geq b_{i1} \geq \ldots \geq b_{iM_b N_a N_b - 1} \quad (3)$$

and the UE would provide an uplink feedback control signal which includes $$\{b_{i0}, b_{i1}, \ldots, b_{ik_j}\} \text{ s.t. } b_{ik_j} \geq \text{absTreshCSI-RS-Consolidation} \quad (4)$$

where absTreshCSI-RS-Consolidation is a reporting threshold.

Various techniques are based on the finding that this increased control signaling overhead includes irrelevant or redundant information. For example, in the scenario illustrated in FIGS. 5-7, the antenna array 1023-1 of the UE 102 directly faces the BS 101 of the cell 161; while the antenna array 1023-2 is oriented away from the BS 101 of the cell 161. The antenna array 1023-to directly faces the BS 101-1 of the cell 162; while the antenna array 1023-1 is oriented away from the BS 101-1 of the cell 162. Thus, it is very unlikely that a receive beam 317-321 formed by the antenna array 1023-2 of the UE 102 will be employed for DL communication of data between the BS 101 and the UE 102 on the wireless link 111. Likewise, it is very unlikely that a receive beam 311-316 formed by the antenna array 1023-1 of the UE 102 will be employed for DL communication of data between the BS 101-1 and the UE 102 on a respective wireless link activated in response to a handover from the cell 161 to the cell 162. However, this situation may dynamically change once the orientation of the UE 102 changes (cf. FIG. 8).

Based on these findings, one or more values of at least one control parameter of monitoring and reporting on beam-swept transmission of pilot signals can be flexibly and dynamically adjusted. Specifically, the one or more values of the at least one control parameter may be adjusted such that control signaling overhead is reduced by avoiding to report on RSRPs of receive beams 311-322 that are unlikely candidates for subsequent transmission of data. Corresponding techniques are discussed in connection with FIG. 9.

Figure 9:
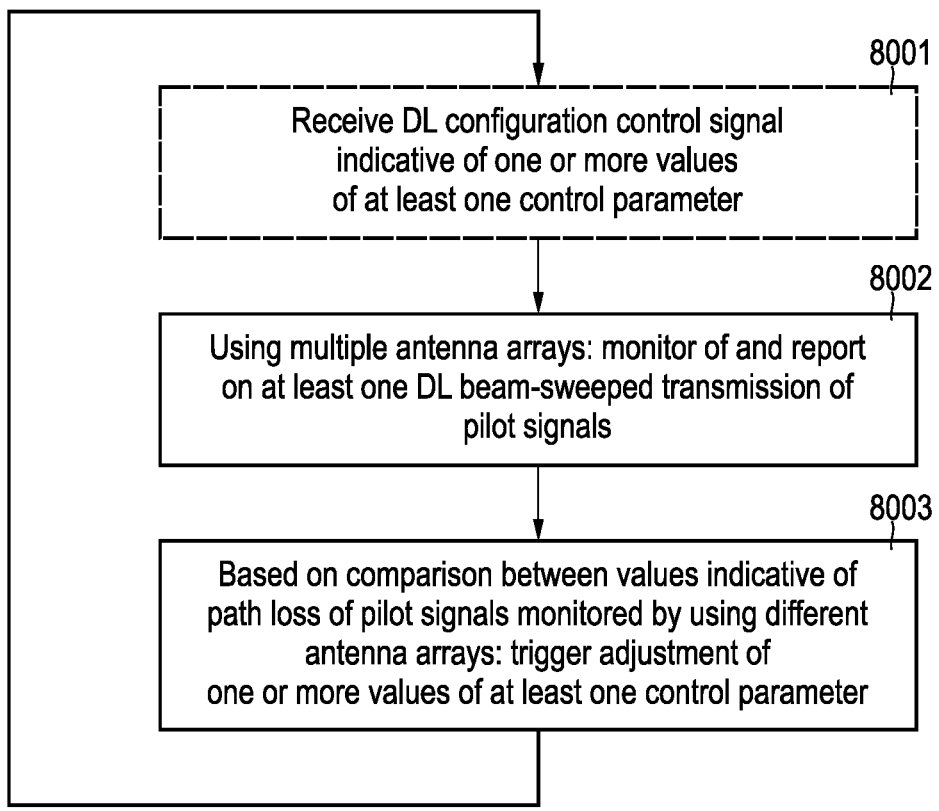
FIG. 9 is a flowchart of a method according to various examples.

FIG. 9 is a flowchart of a method according to various examples. For example, the method may be executed by a UE. The method facilitates configuration of beam management for communication on a wireless link between a BS and the UE. For example, the method of FIG. 9 may be executed by the control circuitry 1022 of the UE 102.

At optional block 8001, a DL configuration control signal is received. The DL configuration control signal is received from a BS. For example, as illustrated in FIG. 4, the DL configuration control signal 4001 may be received.

The DL configuration control signal is indicative of one or more values of at least one control parameter for monitoring and reporting on at least one DL beam-swept transmission of pilot signals.

Next, at block 8002, the monitoring and the reporting on the at least one DL beam-swept transmission of pilot signals is implemented, in accordance with the one or more values of the at least one control parameter indicated by the DL configuration control signal received at block 8001.

Monitoring the at least one DL beam-swept transmission using a respective antenna array may include controlling the respective antenna array to perform multiple receive beam sweeps to measure the RSRP of the pilot signals on respective received beams. For example, one receive beam sweep may be performed per transmit beam sweep of the beam-swept transmission. Thereby, the RSRP can be measured for each pair of transmit beam—receive beam (cf. FIG. 5).

Reporting on the at least one DL beam-swept transmission may include transmitting an UL feedback control signal. The UL feedback control signal is indicative of at least some of the measured RSRPs of the pilot signals on the respective receive beams, e.g., in an explicit or implicit manner (cf. FIG. 4: UL feedback control signal 4003).

Next, the RSRPs of the pilot signals monitored by using different ones of the antenna arrays are compared with each other. For example, the RSRPs of the pilot signals received using receive beams formed by a first antenna array can be compared with the RSRPs of the pilot signals received using receive beams formed by a second antenna array different from the first antenna array. Different types of comparison are conceivable, e.g., an overall average, one-to-one comparison, etc.

Depending on this comparison, adjustment of the one or more values of the at least one control parameter can be triggered or not triggered (selectively triggered).

For example, triggering of the adjustment may include adjusting the one or more values of the at least one control parameter. Here, UE-centric logic can be used to adjust the one or more values. The BS needs not to be involved. In other examples, it is also possible that the BS is at least partly involved. For this, it would be possible that triggering of the adjustment includes transmitting an UL request signal to the BS. For example, the UL request signal can be indicative of a result of the comparison. For example, the UL request signal could be indicative of one or more requested values of the at least one parameter. Then, as indicated in FIG. 9, block 8001 can be re-iterated an updated configuration control signal can be received. By signaling updated one or more values of the at least one parameter, the configuration of the beam management and, in particular, the configuration of the monitoring and reporting can be adjusted.

Example control parameters include a reporting threshold (cf. FIG. 6 where the lower reporting threshold 401 is illustrated). The reporting threshold is for comparison with the RSRP measured when monitoring the DL-sweeped transmission; this threshold comparison can be used to decide whether to include or not to include the respective RSRP in an UL feedback control signal transmitted as part of reporting on the at least one DL beam-sweeped transmission. Example control parameters further include a measurement time gap between subsequent measurements of said monitoring the beam-sweeped transmission of pilot signals. The measurement time gap can correlate with the temporal resolution of monitoring. Example control parameters further include a count of resources used for measurements—e.g., of the RSRP of the pilot signals—as part of said monitoring. For example, the resources may be defined in a time-frequency resource grid of the wireless link between the BS and the UE. The resource grid may include resource elements corresponding to the resources, wherein each resource element may be defined by a symbol duration of the modulation and/or a subcarrier width of the modulation. Example control parameters further include a count of beams of a receive beam sweep used for said monitoring (cf. FIG. 5, where the receive beam sweeps 399-1, 399-2 both include a count of six beams).

As a general rule, such and other value(s) of the at least one control parameter may be set differently for monitoring using different antenna arrays of the UE. For example, a large lower reporting threshold may be used for a first antenna array; while a small lower reporting threshold may be used for a second antenna array. Such examples also apply to other types of control parameters, e.g., measurement gaps, allocated resources, count of beams, etc.

For example, referring to eq. (4),
absTreshCSI-RS-Consolidation→absTreshCSI-RS-Consolidation (a),
where a denotes the particular antenna array 1023-1-1023-4.

Thereby, it becomes possible to tailor monitoring and/or reporting on the DL beam-sweeped transmission on the respective constraints faced when using multiple antenna arrays.

Likewise, as a further general rule, such and other value(s) of the at least one control parameter may be set differently for monitoring and reporting on different DL beam-sweeped transmissions, i.e., different DL beam-sweeped transmissions originating from different cells. For example, a large reporting threshold may be used for a first DL beam-sweeped transmission of a first BS; while a small reporting threshold may be used for a second DL beam-sweeped transmission of a second BS different from the first BS. Such examples also apply to other types of control parameters, e.g., measurement gaps, allocated resources, count of beams, etc. For example, referring to eq. (4), absTreshCSI-RS-Consolidation→absTreshCSI-RS-Consolidation (i),
where i denotes the particular cell 161-167.

Figure 8:
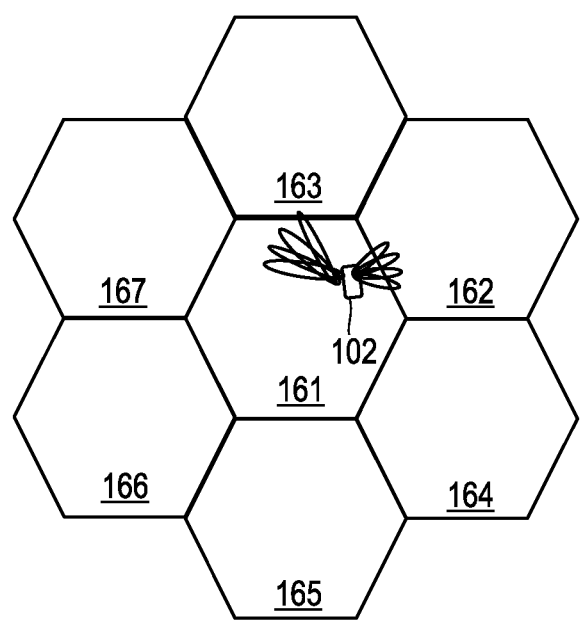
FIG. 8 schematically illustrates beam management in a multi-cell scenario of a cellular network according to various examples.

Thereby, it becomes possible to take into account that the orientation of the UE can have different impacts for the DL beam-sweeped transmissions of pilot signals originating from different cells (cf. FIGS. 7 and 8).

Figure 10:
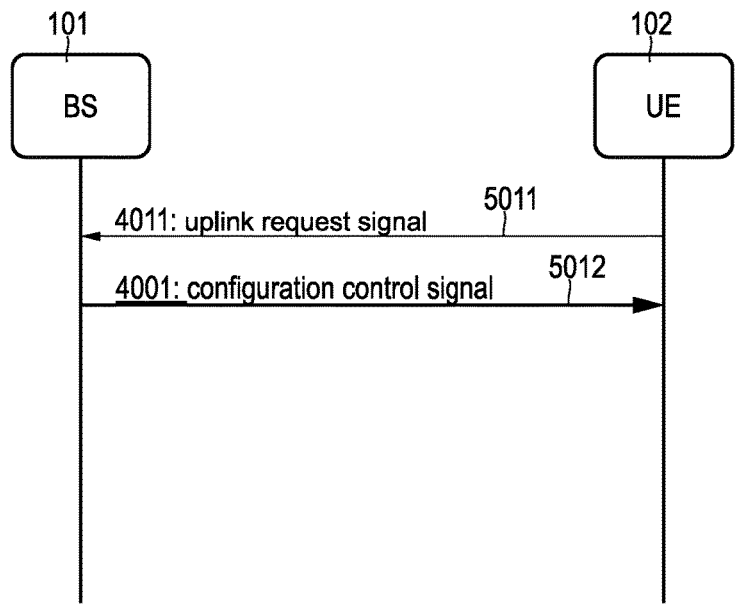
FIG. 10 is a signaling diagram of configuration of beam management according to various examples.

FIG. 10 illustrates aspects with respect to triggering adjustment of the one or more values of the at least one control parameter of monitoring and reporting on a DL beam-sweeped transmission of pilot signals. FIG. 10 is a signaling diagram of communication between the serving BS 101 and the UE 102.

At 5011, the UE 102 transmits an UL request signal 4011 which is then received by the BS 101. For example, 5011 can be part of block 8003 of the method of FIG. 9. The UL request signal 4001 can be indicative of a result of a comparison between the RSRPs measured using different antenna arrays 1023-1-1023-4. In some examples, the UL request signal 4001 can be explicitly indicative of one or more requested values of the at least ne control parameter.

For example, the UL request signal 4001 could be indicative of a plurality of values of a lower reporting threshold. For example, the following reporting thresholds could be requested to the BS 101, which are the triggering thresholds for beam reporting for serving cell 0 and neighbor cells 1, . . . , 6:
{absThresCSI_RS_consolidation(0),
absThresCSI_RS_consolidation(1),
absThresCSI_RS_consolidation(2),
absThresCSI_RS_consolidation(3), . . . ,
absThresCSI_RS_consolidation(6)}

The values could be selected by the UE 102 such that only RSRPs from one antenna array would be reported, while RSPRs from other antenna arrays are not reported.

Moreover, the UE 101 could request certain values for the measurement gap for antenna arrays 0 and 1 for each BS (serving cell) and neighbor cells 1, . . . , 6:
{measGap (0)[0, 1], . . . , measGap (6)[0, 1]}

The BS 101 can then decide on how to react to the UL request signal 4011. For example, the BS 101 may grant the respective request. The BS 101, at 5012, transmits a configuration control signal 4001 which is associated with the UL request signal 4011; e.g., the configuration control signal 4001 can implement a response to the UL request signal 4011. The configuration control signal 4001 is indicative of one or more values of the at least one control parameter, e.g., in accordance with the UL request signal 4001. Here, the one or more values of the at least one control parameter indicated by the configuration control signal 4001 can be selected in accordance with the UL request signal 4011. In other examples, other values can be selected. The UE 102 receives the configuration control signal 4001 and can implement the updated configuration of the monitoring and the reporting, in accordance with the one or more values of the at least one control parameter as indicated in the configuration control signal 4001.

Figure 11:
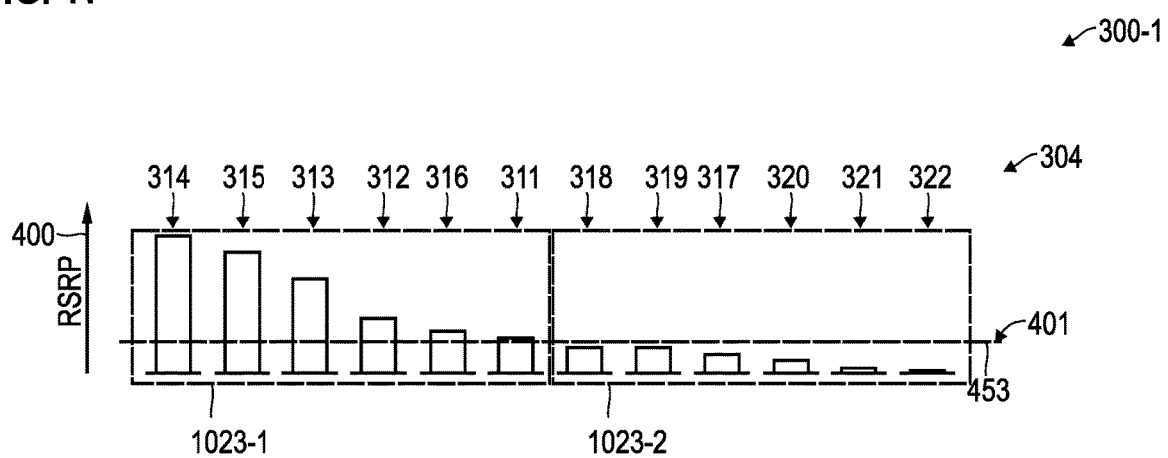
FIG. 11 schematically illustrates reporting on a beam-sweeped transmission of pilot signals according to various examples.

FIG. 11 illustrates aspects with respect to reporting on a DL beam-sweeped transmission 300-1 of pilot signals 4002. FIG. 11 generally corresponds to FIG. 6, wherein the value of the lower reporting threshold 401 has been adjusted from value 451 in FIG. 6 to value 453 in FIG. 11. In the scenario FIG. 12, the adjustment includes setting the value 453 of the lower reporting threshold 401 such that the RSRP 400 is reported for all beams 311-316 formed by the antenna array 1023-1, but not reported for any beams 317-322 formed by the antenna array 1023-2. As a general rule, the adjustment of one or more control parameters can be such that the reporting is restricted to the RSRPs of the pilot signals 4002 monitored using only a subtraction of all available antenna arrays (i.e., only for antenna array 1023-1 in the example of FIG. 11). In other words, the RSRPs measured using only a subtraction of antenna arrays are indicated by the UL feedback control signal 4003. This helps to reduce control signaling overhead.

Figure 12:
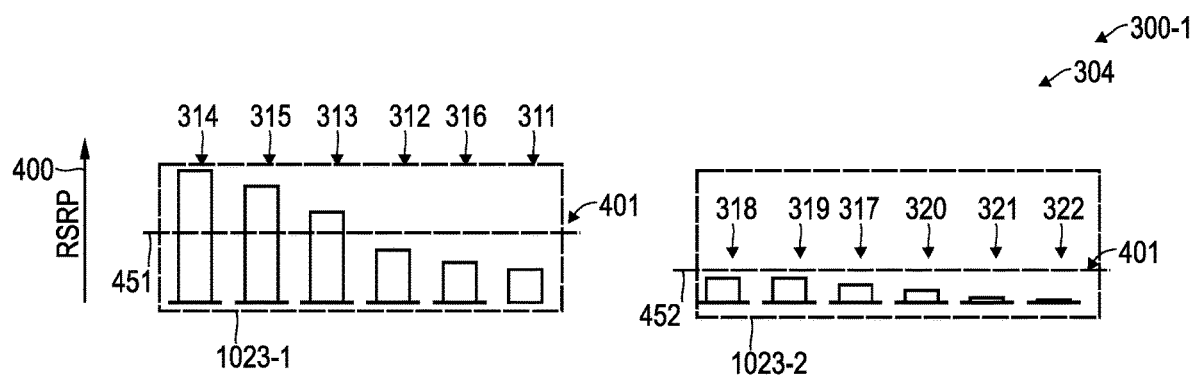
FIG. 12 schematically illustrates reporting on a beam-sweeped transmission of pilot signals according to various examples.

In the scenario FIG. 12, one common value of the lower reporting threshold 401 is used for reporting on all receive beams 311-322 formed by the antenna arrays 1023-1, 1023-2 of the UE 102 (as in FIG. 6). In other scenarios, multiple values of the lower reporting threshold 401 may be used for reporting on the receive beams formed by the different antenna arrays 1023-1, 1023-2. The value of the lower reporting threshold 401 may be set per-array. This is illustrated in connection with FIG. 12.

FIG. 12 illustrates aspects with respect to reporting on a DL beam-sweeped transmission 300-1 of pilot signals 4002. FIG. 12 generally corresponds to FIG. 6, after values 451, 452 of the lower reporting threshold 401 have been adjusted. Specifically, different values 451, 452 are set for the lower reporting thresholds 401 with respect to the received beams 311-316 formed by the antenna array 1023-1 and with respect to the received beams 317-322 formed by the antenna array 1023-2. As a general rule, different values can be set for monitoring using different antenna arrays.

Specifically, as illustrated in the example of FIG. 12, the values 451, 452 are adjusted such that the RSRP 400 is not reported for any one of the beams 317-322 formed by the antenna array 1023-2 and only for some of the beams 311-316 formed by the antenna array 1023-1; this helps to reduce control signaling overhead.

In the scenario FIG. 12 use of different values 451, 452 of the lower reporting threshold 401 4 monitoring using the different antenna arrays 1023-1, 1023-2 has been illustrated.

It is not required in scenarios that the adjustment includes setting different values 451, 452 for monitoring the DL beam-sweeped transmission using different antenna arrays. In other examples, such a per-array adjustment can also be implemented for different types of control parameters. An example is illustrated in FIG. 13 with respect to the control parameter measurement gap time.

Figure 13:
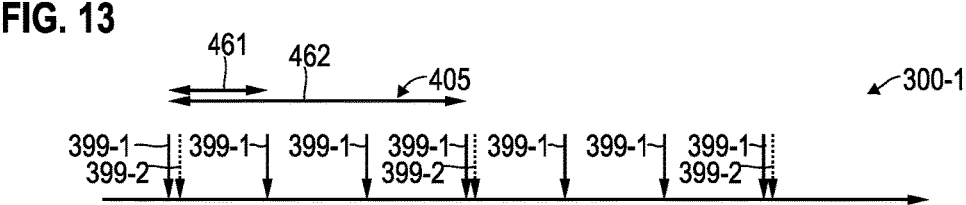
FIG. 13 schematically illustrates reporting on a beam-sweeped transmission of pilot signals according to various examples.

FIG. 13 illustrates aspects with respect to monitoring a DL beam-sweeped transmission 300-1 of pilot signals 4002. FIG. 13 illustrates aspects with respect to adjustment of values 461, 462 of a measurement time gap 405. In the example of FIG. 13, the value 461 of the measurement time gap 405 between subsequent measurements implemented by receive beam sweeps 399-1 using the antenna array 1023-1 is set to a short duration; while the value 462 of the measurement time gap 405 between subsequent measurements implemented by the receive beam sweep 399-2 using the antenna array 1023-2 is set to a long duration.

In the examples of FIGS. 12 and 13, different values of the control parameters 401, 405 are used for monitoring and reporting on a common DL beam-sweeped transmission 300-1 from the serving BS 101. Generally, different values of the various control parameters described herein may alternatively or additionally be set for monitoring and reporting on different DL beam-sweeped transmissions, e.g., DL beam-sweeped transmissions 300-1, 300-2 originating from different BSs 101, 101-1 (cf. FIG. 4). Also, adjustment of the respective values can be implemented for different types of control parameters. A further type of control parameter in the form of the count of resources used for measurements on pilot signals when monitoring is illustrated in connection with FIG. 13.

Figure 14:
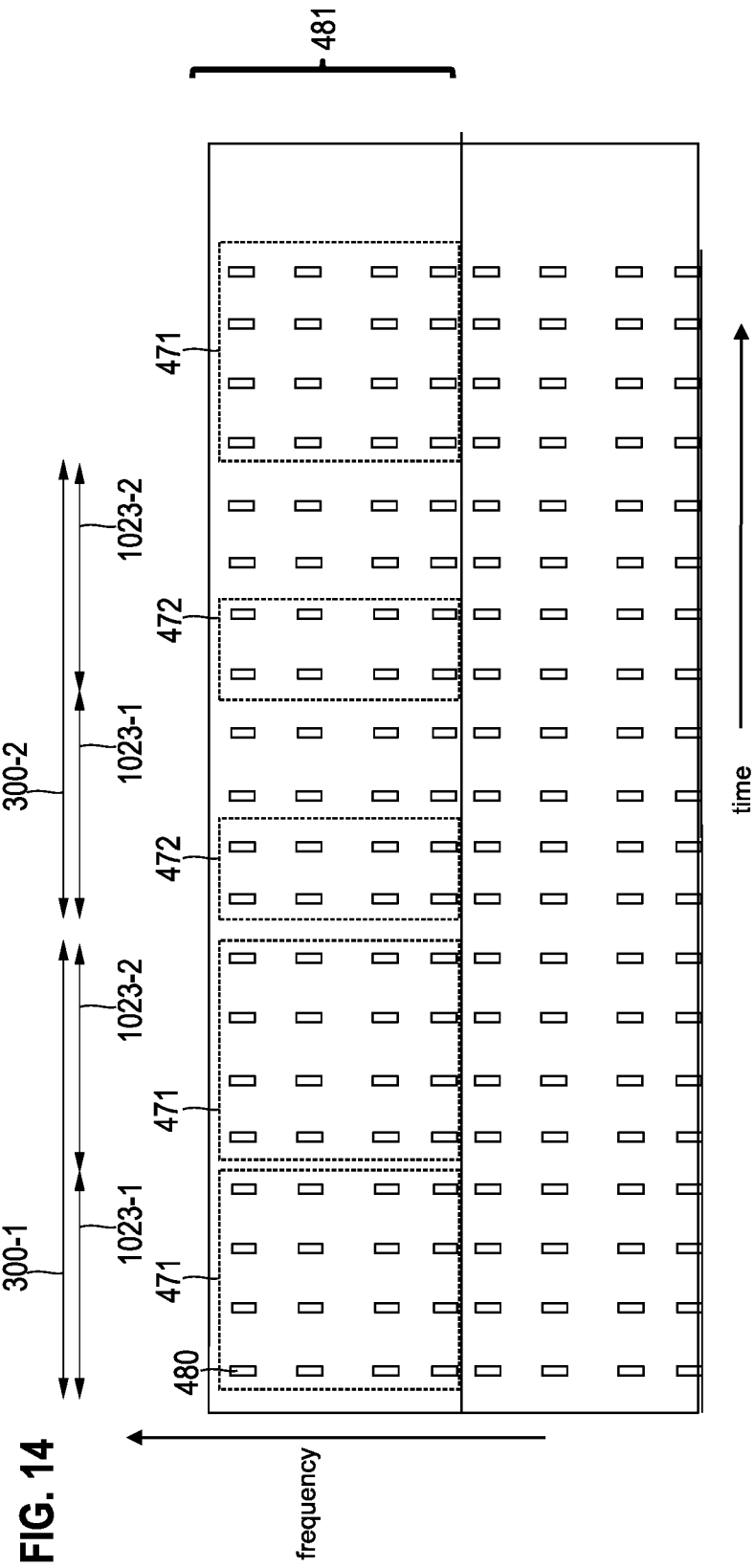
FIG. 14 schematically illustrates allocation of resources to a beam-sweeped transmission of pilot signals according to various examples.

FIG. 14 illustrates aspects with respect to monitoring DL beam-sweeped transmissions 300-1, 300-2 of pilot signals 4002. FIG. 14 illustrates aspects with respect to adjustment of values 471, 472 of a count of resources 480 on which measurements of pilot signals 4002 is implemented when monitoring the DL beam-sweeped transmissions 300-1, 300-2.

FIG. 14 illustrates a time-frequency resource grid including multiple resources 480. The measurements are restricted to an allocated subband within the overall bandwidth of are respective carrier.

In the example of FIG. 14, fewer resources 480 are used by the UE 102 to measure the pilot signals 4002 of the DL beam-sweeped transmission 300-2 form the BS 101-1 if compared to the resources 480 used by the UE 102 to measure the pilot signals 4002 of the DL beam-sweeped transmission 300-1 from the serving BS 101.

Figure 15:
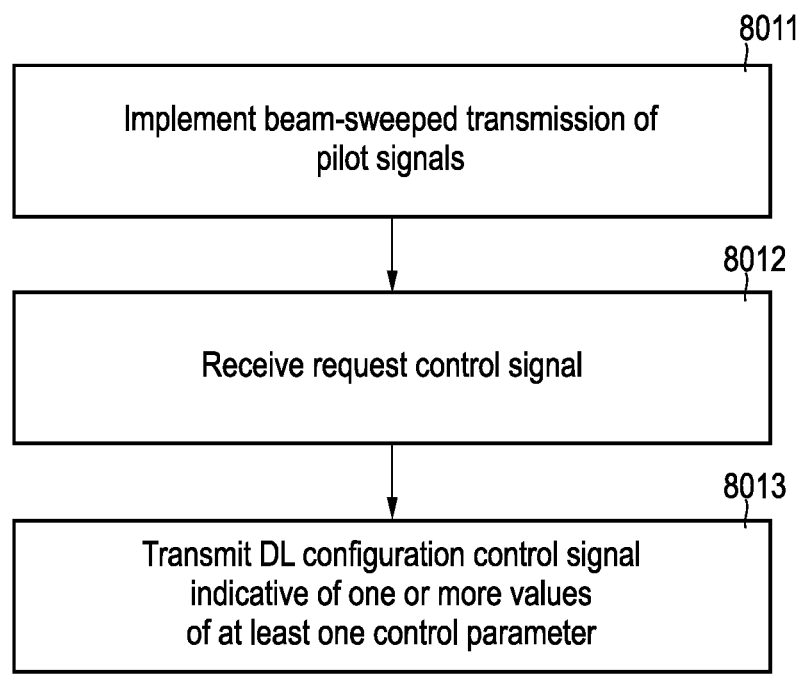
FIG. 15 is a flowchart of a method according to various examples.

FIG. 15 is a flowchart of a method according to various examples. For example, the method may be executed by a BS. The method facilitates configuration of beam management for communication on a wireless link between the BS and a UE. For example, the method of FIG. 15 may be executed by the control circuitry 1012 of the BS 101.

At block 8011, a beam-sweeped transmission of pilot signals is implemented. For this, one or more antenna arrays of the BS can be controlled to implement a transmit beam sweep. Block 8011 can be inter-related with block 8002; the UE can monitor and report on the beam-sweeped transmission.

At block 8012, a request control signal is received from the UE. The UE can indicate a need for adjustment of one or more values of at least one control parameter of said monitoring and reporting.

At block 8013, the BS transmits a configuration control signal which is indicative of one or more values of the at least one control parameter. The UE can then set the one or more values of the at least one control parameter accordingly.

Summarizing, above techniques have been described which facilitate tailoring a configuration of beam management, specifically of monitoring and reporting on beam-sweeped transmission of pilot signals. For example, a reporting threshold can be set.

This is based on the finding that in view of rotation of the UE, the beam strength of beams from one antenna array when facing the serving BS can be 20 dB better than the other antenna array, e.g., back antenna array. It is beneficial for UE to be able to signal the BS if one antenna array is more likely to be used than the other antenna array. Only the used antenna array needs to be monitored more frequently; whereas the unused antenna array can be monitored in a more sparse fashion. Beam reports are triggered by reporting thresholds configured by BS. Reference implementations only support one reporting threshold for each reported beam quantity and one measurement gap per UE per cell. Here, techniques have been described to (i) different reporting thresholds for different antenna arrays per UE, per cell; (ii) the UE requesting adjustment on such reporting thresholds, or more generally providing feedback on the impact of the respective reporting thresholds; (iii) using different measurement gaps for different antenna arrays per UE, per cell; (iv) signaling techniques to support (i)-(iii).

For example, the techniques described above may facilitate the following practical example: when the beam strengths of the receive beams formed by the front antenna array is much stronger than for the back array, for example after UE rotation, the UE transmits an UL request signal to the serving BS to modify absThresCSI_RS_consolidation(0) so that only the front antenna arrays beams would be reported; and/or the pilot signal resources corresponding to the front antenna arrays beams would be measured and reported. The UE may transmit an UL request message to the serving BS to request/recommend different measurement gaps for the resources corresponding to the front antenna array and back antenna array as the back antenna array beams do not need to be measured as often as the front antenna array beams.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, above, various scenarios have been described in which a beam-sweeped transmission of DL pilot signals is used. For example, a DL transmit beam sweep and a DL receive beam sweep have been described to be employed for beam management. Respective techniques may be readily applied to other scenarios, e.g., to an UL transmit beam sweep and an UL receive beam sweep or to beam sweeps on a side link channel using UE-to-UE communication. A beam-sweeped transmission of sidelink pilot signals or uplink pilot signals may be employed.

For further illustration, above, reference is made to RSRP as a particular implementation of a value indicative of the path loss; but, generally, other values indicative of the path loss may be readily employed.

What is claimed is:

1. A method of operating a terminal comprising multiple antenna arrays, the method comprising:
    using the multiple antenna arrays: respectively monitoring and reporting on at least one downlink beam-sweeped transmission of pilot signals, and
    based on a comparison of values indicative of a path loss of the pilot signals monitored using the multiple antenna arrays: selectively triggering adjustment of one or more values of at least one control parameter of said monitoring and reporting,
    wherein the at least one control parameter comprises a measurement time gap between subsequent measurements of said monitoring.

2. The method of claim 1,
    wherein the adjustment comprises setting different values of the at least one control parameter for monitoring using different antenna arrays.

3. The method of claim 1,
    wherein the at least one downlink beam-sweeped transmission comprises multiple downlink beam-sweeped transmissions of multiple cells,
    wherein the adjustment comprises setting different values of the at least one control parameter for monitoring and reporting on different downlink beam-sweeped transmissions.

4. The method of claim 1,
wherein the at least one control parameter comprises a reporting threshold for the values indicative of the path loss to be included in an uplink feedback control signal of said reporting.

5. The method of claim 1,
wherein the at least one control parameter comprises a count of resources used for measurements of the values indicative of the path loss of said monitoring.

6. The method of claim 1,
wherein the at least one control parameter comprises a count of receive beams of a receive beam sweep of said monitoring.

7. The method of claim 1,
wherein said monitoring the downlink beam-sweeped transmission using a respective antenna array comprises controlling the respective antenna array to perform multiple receive beam sweeps to measure the values indicative of the path loss of the pilot signals.

8. The method of claim 1,
wherein said reporting on the downlink beam-sweeped transmission comprises transmitting an uplink feedback control signal indicative of at least one of the values indicative of the path loss of the pilot signal.

9. The method of claim 8,
wherein the adjustment is such that the uplink feedback control signal is indicative of the values indicative of the path loss of the pilot signals monitored by only a subfraction of the multiple antenna arrays.

10. The method of claim 1,
wherein said triggering of the adjustment comprises:
transmitting an uplink request signal indicative of a result of the comparison.

11. The method of claim 10, further comprising:
receiving a downlink configuration control signal associated with the uplink request message and indicative of the one or more values of the at least one control parameter.

12. The method of claim 1,
wherein said triggering of the adjustment comprises:
transmitting an uplink request signal indicative of one or more requested values of the at least one control parameter.

13. A terminal, comprising:
multiple antenna arrays,
a control circuitry configured to
using the multiple antenna arrays, respectively monitor and report on at least one downlink beam-sweeped transmission of pilot signals, and
based on a comparison of values indicative of a path loss of the pilot signals monitored using the multiple antenna arrays: selectively trigger adjustment of one or more values of at least one control parameter of said monitoring and reporting,
wherein the at least one control parameter comprises a measurement time gap between subsequent measurements of said monitoring.

14. A method of operating a base station, the method comprising:
implementing at least one downlink beam-sweeped transmission of pilot signals,
receiving, from a terminal, an uplink request signal indicative of one or more requested values of at least one control parameter used by the terminal to monitor and report on the downlink beam-sweeped transmission, and
transmitting, to the terminal, a downlink configuration control signal associated with the uplink request message and indicative of one or more values of the at least one control parameter,
wherein the at least one control parameter comprises a measurement time gap between subsequent measurements of said monitoring.

* * * * *